Patented Jan. 5, 1932

1,840,162

UNITED STATES PATENT OFFICE

HEINRICH HEIMANN, OF DESSAU, IN ANHALT, ERICH OPFERMANN, OF BERLIN-CHARLOTTENBURG, IRNFRIED PETERSEN, OF WOLFEN, KREIS BITTERFELD, AND ALFONS BAYERL, OF DESSAU, IN ANHALT, GERMANY, ASSIGNORS TO I. G. FARBENINDUSTRIE AKTIENGESELLSCHAFT, OF FRANKFORT-ON-THE-MAIN, GERMANY

PROCESS OF OPENING-UP RESINIFEROUS WOOD

No Drawing. Application filed March 26, 1931, Serial No. 525,610, and in Germany April 12, 1930.

Our invention relates to an improvement in the process for separating or extracting cellulose from materials containing cellulose, such as wood, with nitric acid and more particularly to such a process according to which a cellulose nearly free from resins, is obtainable even when starting from a wood containing a high percentage of resin.

The process of opening-up resiniferous wood by the action of nitric acid, has not been carried out hitherto on a technical scale.

Now we have found that a very pure cellulose, nearly free from resins, is obtainable from a cellulose-containing material, containing also a high percentage of resin, such as pine-wood, by impregnating it with diluted cold or warm nitric acid, by allowing the starting material thus impregnated to stand until the opening-up process is completed, by after-treating the material with an alkali, by subjecting it to a preliminary bleaching operation with 1 to 8% of chlorine according to the degree of decomposition of the incrusts, by acting upon the preliminarily bleached cellulose with a cold caustic soda solution of about 5 to 10% strength and by finally bleaching again the product obtained. The material thus obtainable contains α-cellulose in an amount of about 95%, the amount of resin or fats being not higher than 0.3%. The yield obtained cannot be reached by any other process of opening-up resiniferous wood.

Our invention is illustrated by the example following hereafter:

Pine-wood shavings containing 3 to 5% of resin are treated under a diminished pressure corresponding to about 700-730 mm. of mercury with nitric acid of 30% strength and are allowed to stand at ordinary pressure for about 2 hours at a temperature of about 30 to 50° C. Then they are freed from the excess of acid. The material thus impregnated with nitric acid then is after-treated for 2 to 4 hours with pure water or with water containing a small amount of nitric acid at a temperature of 60 to 80° C. Generally the decomposition is complete after this after-treatment, otherwise it may be repeated. The material thus opened-up then is boiled for about 2 hours with a caustic soda solution of about 2-3% strength, in order to dissolve the products of oxidation. Then it is subjected to a preliminary bleaching with about 4 to 5% of chlorine calculated on the amount of rough pulp and to a treatment in the cold with a caustic soda solution of about 8% strength for 1 to 2 hours. It is finished by a further bleaching operation with the aid of 1 to 2% of chlorine in a weakly alkaline solution.

The process of extracting cellulose from cellulose-containing materials with nitric acid which is the subject matter of U. S. specification Ser. No. 443,914, filed on April 12, 1930, by Heinrich Heimann, Irnfried Petersen, Alfons Bayerl and Hermann Seefried, is not claimed in the present specification.

What we claim is:—

1. The process of manufacturing a cellulose nearly free from resins and containing a high percentage of α-cellulose from cellulose-containing materials containing also a high percentage of resin, which comprises opening-up the starting material with nitric acid, subjecting the product obtained to the action of a boiling caustic alkali solution, then to a preliminary bleaching with chlorine, then to a second treatment with dilute caustic soda and finally to a further bleaching operation.

2. The process which comprises impregnating pine-wood under diminished pressure with nitric acid of about 30% strength, allowing the impregnated material to stand for about 2 hours at a temperature of about 30 to 50° C., removing the excess of acid, after-treating the material still impregnated with acid with a washing agent of the group consisting of hot water and highly diluted nitric acid at a temperature of about 60 to 80° C., boiling the mass obtained for about 2 hours with caustic alkali of about 2 to 3% strength, subjecting it to a preliminary bleaching with chlorine in an amount corresponding to about 4 to 5% of the rough pulp, treating it in the cold with a caustic soda solution of about 8% strength for about 1 to 2 hours and finally bleaching the mass with about 1 to 2% of chlorine in a weakly alkaline solution.

3. The process of manufacturing a cellulose nearly free from resins and containing a high percentage of alpha-cellulose from cellulose-containing materials containing also a high percentage of resin, which comprises opening-up the starting material with nitric acid, subjecting the product obtained to the action of a caustic alkali solution, then to a preliminary bleaching with chlorine, then to a second treatment with dilute caustic soda and finally to a further bleaching operation.

In testimony whereof, we affix our signatures.

HEINRICH HEIMANN.
ERICH OPFERMANN.
IRNFRIED PETERSEN.
ALFONS BAYERL.